United States Patent
Jensen et al.

(10) Patent No.: US 10,234,272 B2
(45) Date of Patent: Mar. 19, 2019

(54) OPTICAL SENSOR HAVING VARIABLE MEASURING CHANNELS

(71) Applicant: TESA SA, Renens, Vaud (CH)

(72) Inventors: Thomas Jensen, Rorschach (CH); Patrick Ilg, Wangen (DE); Julien Chardonnens, Bulle (CH); Lorenz Leimgruber, Lausanne (CH); Alessandro Nardulli, Bevaix (CH)

(73) Assignee: TESA SA, Renens (CH)

( * ) Notice: Subject to any disclaimer, the term of this patent is extended or adjusted under 35 U.S.C. 154(b) by 0 days.

(21) Appl. No.: 15/497,152

(22) Filed: Apr. 25, 2017

(65) Prior Publication Data

US 2018/0112971 A1 Apr. 26, 2018

(30) Foreign Application Priority Data

Oct. 26, 2016 (DE) .................... 20 2016 006 669 U (51) Int. Cl.
*G01B 11/02* (2006.01)
*G01B 21/04* (2006.01)
(Continued)

(52) U.S. Cl.
CPC .......... *G01B 11/026* (2013.01); *G01B 11/005* (2013.01); *G01B 11/007* (2013.01);
(Continued)

(58) Field of Classification Search
CPC . G01B 11/002; G01B 11/005; G01B 11/2441; G01B 11/14; G01B 11/026; G01B 9/02049
See application file for complete search history.

(56) References Cited

U.S. PATENT DOCUMENTS

| 5,388,342 A | 2/1995 | Garau et al. |
|---|---|---|
| 5,402,582 A | 4/1995 | Raab |

(Continued)

FOREIGN PATENT DOCUMENTS

| DE | 43 25 337 A1 | 2/1994 |
|---|---|---|
| DE | 43 25 347 A1 | 2/1994 |

(Continued)

*Primary Examiner* — Jonathan M Hansen
(74) *Attorney, Agent, or Firm* — Maschoff Brennan (57) ABSTRACT

Optical sensors are adapted for distance measurement by emission and capture of measuring radiation reflected from an object to be measured. The optical sensors can be used with measuring devices, including coordinate measuring machines. The optical sensors have an optomechanical coupling unit, configured for automated coupling of the optical sensor to the measuring device and for bidirectional measuring radiation transmission between measuring device and optical sensor. The optical sensors have a first optical measuring channel, by which bidirectional measuring radiation transmission is provided between the measuring device and a first exit window of the optical sensor. The optical sensors have a second optical measuring channel, by which bidirectional measuring radiation transmission is provided between the measuring device and a second exit window of the optical sensor, and a switch for controlled variation of the measuring radiation transmission between at least the first or the second optical measuring channel.

26 Claims, 3 Drawing Sheets

(51) Int. Cl.
  *G01B 11/00* (2006.01)
  *G01D 5/26* (2006.01)
  *G01B 5/008* (2006.01)
  *H01H 59/00* (2006.01)

(52) U.S. Cl.
  CPC .......... *G01B 21/047* (2013.01); *G01D 5/268* (2013.01); *G01B 5/008* (2013.01); *G01B 2210/58* (2013.01); *H01H 59/0009* (2013.01)

(56) References Cited

U.S. PATENT DOCUMENTS

| | | | |
|---|---|---|---|
| 5,822,877 A * | 10/1998 | Dai ........................ | G01B 7/012 33/557 |
| 9,127,929 B2 * | 9/2015 | Siercks ................ | G01B 11/005 |
| 9,677,871 B2 * | 6/2017 | Schonleber ........ | G01B 9/02091 |
| 2013/0176561 A1 * | 7/2013 | Hidaka .................. | G01B 11/14 356/300 |
| 2013/0265583 A1 * | 10/2013 | Mansell ............. | G01B 9/02028 356/482 |
| 2013/0314689 A1 * | 11/2013 | Jones .................... | G01B 21/047 356/4.01 |
| 2017/0030702 A1 | 2/2017 | Jensen et al. | |

FOREIGN PATENT DOCUMENTS

| | | |
|---|---|---|
| DE | 10 2005 061 464 A1 | 7/2007 |
| DE | 10 2014 215 931 B4 | 11/2016 |
| EP | 1 474 650 B1 | 6/2007 |
| EP | 2 037 214 A1 | 3/2009 |
| EP | 2 356 401 B2 | 3/2016 |
| FR | 2 738 343 A1 | 3/1997 |

\* cited by examiner

OPTICAL SENSOR HAVING VARIABLE MEASURING CHANNELS

FIELD OF THE INVENTION

The invention relates to a modular sensor device for a measuring machine, in particular a coordinate measuring machine (CMM), having a switchable beam path and a system made of such a sensor device and a measuring machine.

BACKGROUND

Determining the distance to measurement points forms the foundation for a variety of measuring tasks and for corresponding measuring devices. In particular, optical distance measurement is used, for example, for measuring devices in surveying (geodesy) or in industrial workpiece testing and/or measurement. In this case, for example, coordinates of points on a workpiece to be monitored can be determined. The advantages of these methods are in particular a broad area of application as a result of the comparatively long measurement range and the comparatively high measurement accuracy, which can be provided, for example, by interferometric distance measurement.

The need exists in many technical and/or industrial areas of application for measuring surfaces of objects and therefore also the objects themselves with high accuracy. This applies in particular to the manufacturing industry, for which the measuring and checking of surfaces of produced workpieces has great significance, in particular also for purposes of quality control.

Coordinate measuring machines are typically used for these applications, which enable a precise measurement of the geometry of an object surface, typically with micrometer accuracy. Objects to be measured can be, for example, engine blocks, transmissions, and tools. Known coordinate measuring machines measure the surface, for example, in that a mechanical contact is produced and the surface is scanned. Examples of this are gantry-type measuring machines, as are described, for example, in DE 43 25 337 or DE 43 25 347. Another system is based on the use of an articulated arm, the measuring sensor of which, which is arranged at the end of the multipart arm, can be moved along a surface. Articulated arms of the type in question are described, for example, in U.S. Pat. No. 5,402,582 or EP 1 474 650. U.S. Pat. No. 5,822,877 describes a multiprobe system for use on a CMM, consisting of several individual probes mounted side by side on a support structure.

In addition, the use of optical measuring sensors in coordinate measuring machines has become routine. The optical sensors used for this purpose are based on irradiation of, for example, laser light onto an object surface for interferometric measurements (EP 2 037 214). Methods based on white light interferometry (DE 10 2005 061 464) and chromatic-confocal methods (FR 273 8343) are also known. The measuring sensors may be exchanged flexibly and automatically via optomechanical coupling elements on the coordinate measuring machine (EP 02356401).

Optical sensors and/or optical measuring methods for a coordinate measuring machine are linked to an array of advantages: the measurement is performed in a contactless manner, and the optical sensor can be guided more rapidly than a tactile sensor over an object surface, with smaller physical dimensions of the "measuring tip", whereby a higher lateral resolution of the measurement is enabled.

However, the mentioned optical measuring methods share the disadvantage of distance measurement with reduced accuracy in the event of unfavorable environmental influences, for example, vibrations on the measuring device. Additional limitations may arise on surfaces which are difficult to measure, for example, which cause strong scattering of the measuring radiation or have an unfavorable roughness with respect to the selected radiation properties. Furthermore, the problem exists that frequent exchange of the optical sensor has to be performed in the case of complex workpiece geometries, to provide the matching sensor for a respective surface section. For example, a pivotable sensor is suitable for scanning a curved surface. However, it could be oriented in each case so that the measuring radiation is incident nearly orthogonally on the object surface to achieve optimum measuring conditions.

However, such a sensor would be entirely unsuitable for measuring a borehole, because the measuring radiation thus could not be oriented in the direction of the borehole circumference, but rather solely axially in the direction of the borehole depth. The measuring sensor thus has to be exchanged for such a measurement. This exchange procedure generally requires a comparatively large amount of processing time, whereby the overall time consumed by a measuring procedure increases significantly.

On the other hand, using a continuous probe head allows to be normal to surface, however this alters the accuracy of the system.

A similar problem results in the case that, for example, one section of an object is to be captured with greater accuracy than another section of the object. Different optical sensors would also typically be used for this purpose—a low-resolution sensor to do a rapid scanning, and a second high-resolution sensor, to measure with increased accuracy.

Such a requirement for an exchange of the measuring sensor, to adapt, for example, to the object geometry, can reduce the efficiency of a measuring process.

SUMMARY

Some embodiments of the present invention provide an improved components for optical object measuring, whereby the measuring time required for a measurement can be reduced.

Some embodiments provide a corresponding system, wherein the number of required sensor exchanges for measuring a specific object can be reduced.

The invention relates to an optical sensor (optical probe) for a measuring device, in particular for a coordinate measuring machine (CMM), for distance measurement by means of emission of measuring radiation and capture of measuring radiation reflected from an object to be measured. The sensor has an (optomechanical) coupling unit, which is configured for the automatable or automated coupling of the optical sensor to the measuring device and for providing bidirectional measuring radiation transmission between measuring device and optical sensor.

Optical probes are preferably used for measuring a borehole, a blade, a blisk (blade integrated disk), a cam, a gear, a thread or other profiles.

On the one hand, an optomechanical coupling unit provides a mechanical connection of the sensor to, for example, a CMM, i.e., coupling and decoupling of the sensor which is repeatable many times is enabled with very high position precision and reproducibility in this regard. On the other hand, this type of coupling unit is also capable of providing a correspondingly accurate and reproducible optical connection of a measuring channel and/or reference channel. Furthermore, this coupling can also provide the electrical contact of the sensor.

In addition, the sensor has a first optical measuring channel, by means of which bidirectional measuring radiation transmission can be provided between the measuring device and a first exit window of the optical sensor. The measuring radiation provided by a CMM can therefore be oriented along this first measuring channel through the first exit window onto the object and the measuring radiation reflected on this object in this case can in turn be guided—also through the exit window, which also forms a beam entry window in this case—along the same measuring channel back to the CMM. A detector, for example, an interferometrically measuring structure, on the part of the CMM enables a determination of distances to the object on the basis of the reflected radiation.

According to the invention, the optical sensor has a second optical measuring channel, by means of which bidirectional measuring radiation transmission can be provided between the measuring device and a second exit window of the optical sensor, and a switch, in particular an optical switch, for controlled variation of the measuring radiation transmission between at least the first or the second optical measuring channel. The first and the second optical measuring channels and the switch are arranged and designed such that by switching the switch, it varies between the measuring radiation transmission by means of the first measuring channel and the measuring radiation by means of the second measuring channel, and the measuring radiation transmission is therefore only provided in each case by the first or the second measuring channel.

The measuring channels and the switch therefore enable in this way switching over of the measuring radiation emission according to the emission axes provided for this purpose.

In this way, for example, a comparatively complex measuring task can be managed using only one single sensor arrangement, instead of proceeding with an exchange of the measuring sensor mounted on the CMM, as previously required. Thus, the exit window supplied with the measuring channels can be formed having corresponding optical units such that, for example, the emission axes defined in this manner are aligned transversely in relation to one another and a radiation emission and measuring direction is thus (strongly) changed by switching over the active measuring channel. In this way, an adaptation to a significantly changed measuring requirement during a measuring process is enabled, without the optical sensor having to be exchanged. Significantly shorter processing and/or measuring times result therefrom.

The measurements via the two measuring channels can be executed on the basis of a single detector on the part of the CMM. The reflected measuring radiation is returned by means of the respective measuring channel to the detector and captured there. The respective measuring parameters specific to the channels can be provided to the detector and/or a control or analysis unit of the CMM for this purpose—in particular corresponding to the respective active measuring channel.

The first exit window can have a first optical unit for measuring beam forming and for capturing the reflected measuring radiation and the second exit window can have a second optical unit for measuring beam forming and for capturing the reflected measuring radiation. In particular, the first and the second optical units are configured differently with respect to the optical properties thereof, in particular focusing. In this way, for example, solely by means of switching over the measuring channel supplied with measuring radiation, different measuring properties can be provided using a single sensor arrangement and thus an object having, for example, different surface properties can be measured in the respective suitable manner for this purpose.

The optical units can differ, for example, with respect to a (single-axis) measuring beam focusing or a single-axis measuring beam widening, for example, to form a laser line. In particular, the measuring radiation is formable using the optical units such that a beam cross section which is desired (with respect to size and/or shape) for interferometric distance measuring is generated.

According to one embodiment of the invention, the first exit window defines a first emission axis for the measuring radiation and the second exit window defines a second emission axis for the measuring radiation, wherein the first emission axis is different from the second emission axis, in particular orthogonal or parallel thereto. The measuring radiation can thus be emitted onto another measurement point, in particular in another direction, by switching over the switch. Thus, measurement points having different properties (for example, reflection behavior, location on the object, roughness, etc.) can be measured rapidly and efficiently in sequence.

The optical sensor can be configured so that the emission axes are all in the same plane and enclose a defined angle between them. Alternatively, the optical axes are parallel in one common plane.

According to the invention, at least the first optical measuring channel can have an optical fiber and the measuring radiation can be guided by means of the optical fiber, in particular wherein at least the first optical measuring channel is essentially completely formed by the or multiple optical fibers. The optical fiber then extends in particular continuously from the optical switch of the optical sensor up to the associated exit window, in particular having a beam forming optical unit (for example, lens, lens array, aperture, optical grating, etc.)

According to one embodiment at least one optical fiber is fitted with a cladding filter, which is preferably placed on the output side of the switch. Such a filter eliminates cladding modes in the fiber and reduces the noise of the optical signal.

In particular, the second optical measuring channel has a further optical fiber and the measuring radiation is guidable by means of the further optical fiber, in particular wherein the second optical measuring channel is essentially completely formed by the further or multiple optical fibers.

The optical fiber can be arranged at least partially in the interior of the sensor in this case. Furthermore, the optical fiber can be guided generally along the sensor extension on the outer side thereof, in particular fastened by means of a holder, for example, a clamp on the sensor housing or stylus.

According to one embodiment of the invention, the switch is configured as a fiber-coupled optical switch, in particular an electrooptical or acoustooptical switch or a switch based on MEMS technology, in particular as a latching or blocking switch. A switch which is based on MEMS technology is available, for example, as an electrostatic, electromagnetic, or inductive switch (having a coil).

The switch in particular has a very low signal loss when coupling and decoupling the optical radiation.

The switch can have a single input for coupling in the measuring radiation and two or more outputs for decoupling and providing the measuring radiation alternately for the first or second measuring channel and/or alternately for the first, the second, or at least one further measuring channel.

A switch is also conceivable which has two inputs and four outputs, wherein either each two outputs are assigned to one of the inputs and are activatable (switchable) thereby or all four outputs are separately activatable.

The optical sensor has at least one stylus in one embodiment, wherein the first and the second exit windows are arranged having a beam forming optical unit (for the desired conditioning of the measuring radiation and optionally providing an additional reflection for the interferometer reference signal) on the stylus and the first and the second optical measuring channel are formed as optical fibers at least partially inside the stylus. A stylus, i.e., an (oblong) scanning element, is used in particular to extend the sensor, for example, to enable increased flexibility in the measurement point scanning or to measure boreholes.

Such a stylus can be arranged so it is pivotable in relation to the sensor housing, for example. The stylus can additionally have an opening along its extension, through which two or more optical fibers are guided. The optical fibers each form one optical measuring channel in this case. The fibers can be guided up to a respective exit window, preferably at a first end of the stylus.

The stylus has in particular a quantity of optical units, which are provided corresponding to the number of measuring channels, for beam forming and therefore desired emission of the measuring radiation with respect to direction and beam characteristic. A recalibration is provided for each of the optical units to be performed in the event of accidental dislocations, drifts or errors.

The sensor can additionally have a modularly removable and in particular controllably pivotable tactile stylus (touch sensitive) for contact measurement of the measurement points, e.g. a touch trigger probe. This enables both optical and also tactile measuring of measurement points. For example, a measurement point can firstly be optically captured and subsequently tactilely measured for verification.

The tactile probe can also be used to measure accurately one or several reference points on a surface that has been scanned rapidly and with less accuracy by the one or several optical beams. A correction can then be calculated from the difference of the tactile and the corresponding optical measurements. All of the optical data taken on the surface can then be corrected by the calculated amount.

Is has to be understood that the present invention also relates to embodiments having a plurality of styli (e.g. star stylus) and/or a plurality of tactile sensors being attached to one optical probe, wherein at least two optical channels are provided with a respective switch.

Having two or more beams on the sensor with appropriate axes can avoid the need to reorient the stylus in between measurements. By that a gain both of time and accuracy can be provided. According to one embodiment, the optical sensor has a memory, which is passive in particular, wherein the memory has retrievable sensor data, which provide information with respect to optical and/or mechanical properties of the optical sensor, in particular for the first and second measuring channels. Such a memory therefore enables the read-out of the respective active measuring properties (corresponding to the switch position of the switch) and accordingly suitable processing of respective sensor data to determine measuring coordinates.

The data stored in the memory can be retrieved, for example, by a CMM, on which the optical sensor is arranged.

Alternatively or additionally, the sensor can provide an active memory. Such memory can be configured to record, for example, time (hours) of operation of the sensor and other data which can be provided through the probe head or CMM controller.

The invention additionally relates to a system comprising an optical sensor as described above and a measuring device, in particular a coordinate measuring machine, having a distance measuring unit, which measures according to the principle of interferometry, for measuring measurement points on an object, a radiation source, in particular a laser diode, for emitting measuring radiation, a detector for detecting at least measuring radiation reflected on the object, and a coupling unit on the measuring device side, wherein the optical sensor can be coupled by means of its coupling unit to the coupling unit on the measuring device side to provide the bidirectional measuring radiation transmission between measuring device and optical sensor. In addition, the measuring machine has a control and analysis unit.

The control and analysis unit is functionally connected to the switch of the optical sensor and has a switchover functionality, upon the execution of which the switch of the optical sensor is switched such that the measuring radiation transmission is changed between the first and the second measuring channel and the measuring radiation transmission is thus only provided in each case via the first or via the second measuring channel. In particular, the switchover functionality is designed such that upon the execution thereof, the provision of the measuring radiation transmission via the first or via the second optical measuring channel is variable in a controlled, in particular automatically controlled, manner during a measuring procedure as a function of a present normal direction of the object surface to be measured.

The connection between the control unit of the measuring machine and the switch can be, for example, an (electrically contacted) connection for the power supply of the switch and/or a communication connection for control, i.e., to activate the switching procedure using the switch.

The communication connection can be embodied as wired or wireless (by means of radio, WLAN, Bluetooth, etc.) connection. The power connection can be provided in particular by means of an integrated optical-mechanical interface.

According to one special embodiment of the invention, the measuring device is configured as a coordinate measuring machine having a machine base, a measuring head having the optical measuring sensor, which is removable in particular, wherein the measuring sensor has the switch and at least two measuring channels, in particular wherein the measuring head is designed as a pivotable measuring head.

Furthermore, the coordinate measuring machine has at least one drive unit for providing a mobility of a first of the structural components (for example, gantry, carriage, quill) in relation to a second of the structural components or in relation to the machine base in at least one direction and at least one measuring unit (for example, encoder) for determining a relative position of the first structural component in relation to the second structural component or in relation to the machine base.

With respect to the alignment of the measuring radiation, according to one special embodiment, upon execution of a distance determination functionality, the measuring direction is automatically changed in relation to the point to be measured by a change of the position and/or alignment of the measuring head or a stylus and/or the object. This can be achieved in particular by pivoting, rotating, and/or displacing the measuring head or a stylus and/or the object and/or by a controlled adjustment of a micro-adjuster comprised by the measuring sensor, in particular a piezo positioning element or scanner mirror. In this case, for example, multiple deflections of the measuring direction can be performed rapidly, for example, by means of generated vibration of the micro-adjuster and a plurality of measurements having different measuring directions can thus be carried out.

By such combination of a micro-adjuster with the optical switch a more flexible method of measuring and scanning a surface of an object can be provided. On the one hand there can be provided switching between several measuring channels and on the other hand additional (rapid) adjustment of a beam direction can be provided.

According to the invention, the change of the measuring direction is achievable by switching over the measuring channel.

In particular, in conjunction with the change of the measuring direction in relation to the point to be measured, it can be changed such that the measuring direction is oriented in parallel, in particular coaxially, in relation to a surface normal for the measurement point region. This surface normal can be derived in particular on the basis of the measuring procedure in the scope of the distance determination functionality from the individual measurements or the entirety of the measurements.

With respect to the design of the coordinate measuring machine, the invention is not restricted to a gantry construction as mentioned. Rather, any known type of coordinate measuring machine, which enables an object surface measurement using an optical sensor, is suitable for the invention.

BRIEF DESCRIPTION OF THE DRAWINGS

Devices according to the invention will be described in greater detail hereafter, solely by way of example, on the basis of specific exemplary embodiments, which are schematically illustrated in the drawings, wherein further advantages of the invention will also be discussed. In the figures.

DETAILED DESCRIPTION

Figure 1:
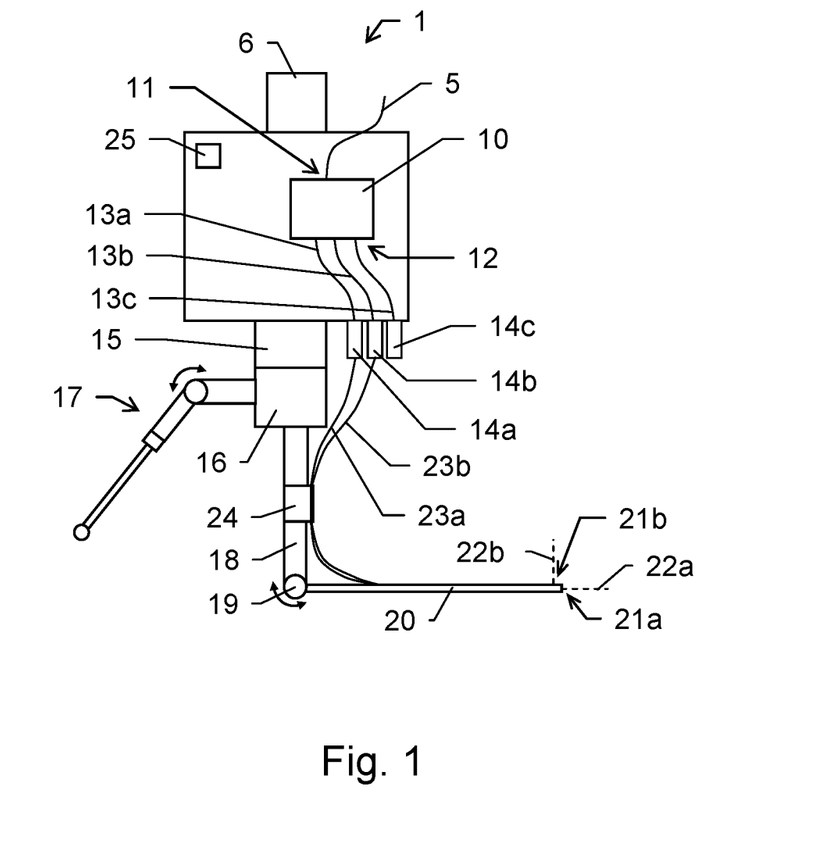
FIG. 1 shows an optical sensor according to the invention having an optical switch and two measuring beam paths.

FIG. 1 shows a first embodiment of an optical sensor 1 according to the invention having an optical switch 10. The optical switch 10 has one optical input 11 and three optical outputs 12 here. According to the invention, the switch can alternatively have two or more than three optical outputs (not shown).

An optical fiber 5 is coupled to the optical input 11, the second end of which (not shown here) can be coupled to a corresponding interface of a coordinate measuring machine. By means of the optical fiber 5, measuring radiation provided by the coordinate measuring machine is transmittable bidirectionally between the measuring machine and the sensor 1. Radiation emitted on the part of the measuring machine can thus be transmitted for measurement to the sensor 1 and measuring radiation reflected on a workpiece can be guided back to the measuring machine and/or to a corresponding detector.

The sensor 1 has, in addition to the optical coupling element (in particular optical fiber 5), an electrical coupling element (in particular plug or other connector; not shown) and a mechanical coupling element 6. The electrical coupling element provides power to the optical sensor as well as an interface for control signals between the CMM and the sensor. The mechanical coupling element 6 enables a modular attachment of the optical sensor 1 to a CMM. The mechanical coupling element, the electrical coupling element and the optical coupling element (in particular the optical fiber 5 and/or the optical connecting part thereof) are configured to provide a plurality of exchange cycles without impairing the optical measuring properties or the accuracy with respect to the mechanical coupling.

The three optical outputs 12 are each in turn connected by a respective optical fiber 13a-c accordingly to three optional connecting parts 14a-c of the optical sensor 1.

Furthermore, a mechanical interface 15 for coupling further, different components (for example, stylus, pivot unit, etc.) and for the modularity and flexibility of the overall sensor thus provided is provided at the lower end of the main housing of the optical sensor 1.

The previously identified components, i.e., the optical switch 10 having inputs and outputs, the optical fibers, the mechanical coupling element 6, the optical connecting parts 14a-c, and the mechanical interface 15, form the so-called sensor interface. This therefore forms an "adapter element" between the coordinate measuring machine and the possible expansions of the sensor 1.

In the embodiment shown here, a further optional adapter part 16 is attached to the sensor interface, which enables an additional arrangement of a particularly movable (pivotable) tactile measuring sensor 17. Both optical and also tactile measurements can thus be performed by means of the sensor 1.

In addition, an extension part 18 is provided, at the lower end of which a pivot joint 19 is arranged for pivoting an optical scanning element 20 (stylus) in turn arranged thereon. The optical stylus 20 has two beam exit windows 21a-b, through which the measuring radiation is emittable either in parallel to the extension of the stylus 20 along a first emission axis 22a or orthogonally to the extension of the stylus 20 along a second emission axis 22b.

Of course, it has to be understood in context of the whole description that the two emission axes 22a and 22b may enclose an angle other than 90°, in particular between 0° and 90°.

In particular the stylus is embodied as a so called quad-stylus which comprises a star-like structure at its distal end having four optical emission directions and thus providing four optical tips. Emission of the measuring light can be switched to be emitted by one defined of those emission directions. Furthermore, a stylus having five emission windows can be provided.

The pivot or rotary joint 19 can alternately be embodied as manually adjustable or adjustable controlled by a motor, for example, using a stepping motor.

The two exit windows 21a and 21b having optical units (not shown) are supplied by means of two optical fibers 23a and 23b, i.e., a measuring beam transmission is provided through the optical fibers 23a-b and through the connecting parts 14a-b to and from the optical switch 10. In this way, a first and a second measuring channel (measuring beam path) are thus provided. The optical fibers 23a and 23b are partially guided here in the interior of the stylus 20 and/or are partially guided externally along the geometry of the sensor 1, in particular with the aid of a mount 24, for example, with the aid of a clamp fastened on the extension part 18.

The optical switch 10 is designed such that switching over the active beam path between the available outputs, i.e., an open continuous path via one of the optical fibers 13a-c, can be provided alternately and in a controlled manner.

In other words, the measuring radiation reaches the sensor by means of the first optical fiber 5 and is guided in the switch 10. The switch is set, for example, so that the radiation is coupled into the fiber 13a and is conducted by it through the corresponding connecting part 14a into the optical fiber 23a and is finally emitted via an optical unit through the first exit window 21a along the first emission axis 22a. During a measurement, the measuring radiation thus emitted is at least partially reflected on the object to be measured and it is guided in the reverse direction together with a second reflection (local oscillator) out of the optical unit along the same path in the so-called "common path" arrangement through the sensor 1 back to the CMM and to the analysis unit, which detects and analyzes the interferometric signal. In other words, a part of the measuring radiation may be reflected back from the optical unit instead of being emitted and is also guided in the reverse direction back to the CMM and analysis unit.

In this way, by means of the optical unit at the exit window, not only can the measuring radiation be formed in the desired manner, but also an additional reference reflection can be generated. A reference arm of the interferometer is then provided by this reference reflection. By superimposing the reference signal with the measuring signal reflected from the object, the combined interference signal, which is analyzable with respect to a distance determination, is generated. The measuring signal and the reference signal can be guided jointly in the optical fiber.

If a measurement procedure has the requirement, for example, that firstly an object surface and subsequently a borehole, for example, the internal diameter thereof, are to be measured, to provide measuring parameters suitable for this purpose, the beam path can be varied by means of the switch 10 such that the measuring radiation is no longer coupled into the optical fiber 13a, but rather is coupled into the fiber 13b. The measuring radiation then reaches the second exit window 21b via the relaying optical fiber 23b and is emitted along the second emission axis 22b. The stylus 20 can thus be introduced into the borehole and the inner surface measurement on the borehole can be executed on the basis of the orthogonally emitted measuring radiation.

The components having the reference signs 16-20 and 24 form the modularly changeable part of the sensor 1, i.e., for example, the adapter part 16, the tactile sensor 17, the extender part 18, and the joint 19 are components which can be provided solely optionally and these can be omitted or can be provided in an alternative embodiment.

Furthermore, the measuring radiation can alternatively be guided in the interior of the stylus, for example, using free beam optics instead of the optical fibers.

The optical sensor 1 additionally has a memory 25. This memory 25 contains data having information about the optical properties and the mechanical properties of the sensor 1, in particular for the scanning element 20 and the measuring parameters provided for the two measuring channels. In this way, the respective presently relevant parameters for the distance measurement can be transmitted to the measuring machine (CMM) and these parameters can be taken into consideration and/or further processed at the measuring machine for the derivation of, for example, measurement point coordinates.

The information stored in the memory 25 can comprise, for example, the length of scanning element 20, a preset angle setting (e.g. an articulation of the stylus and/or an emitting angle of measuring radiation relative to the stylus), specific properties of an optical fiber, and/or a focal length of a measuring optical unit of a measuring channel, to thus ensure an optimally adapted analysis of the interferometric signal, on the one hand, and to enable a control optimized to the measuring path of the coordinate measuring machine, on the other hand. The read-out of the memory 25 can also be performed via the coupling element 6, which has corresponding electrical contacts for this purpose.

Figure 2:
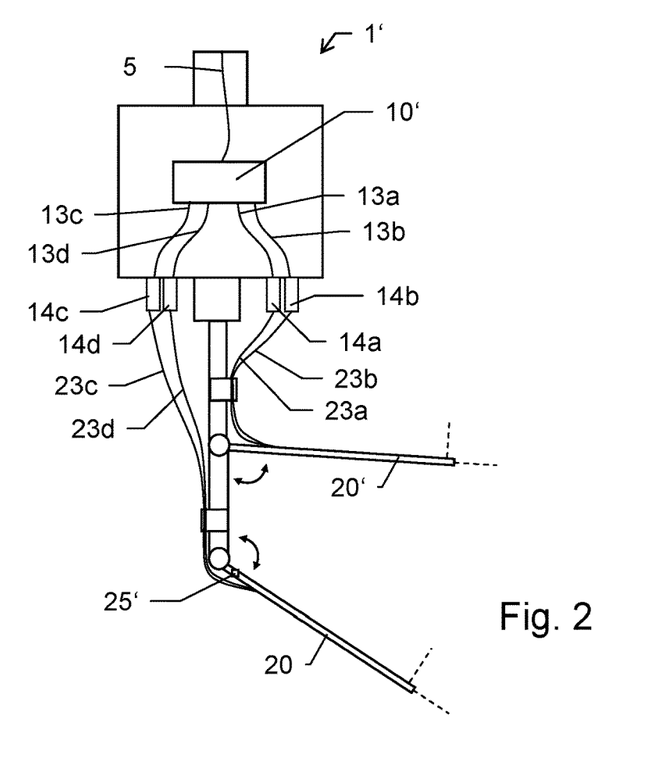
FIG. 2 shows an optical sensor according to the invention having an optical switch and four measuring beam paths.

FIG. 2 shows a further embodiment of an optical sensor 1' according to the invention. Elements of this embodiment which correspond to those of FIG. 1 are provided with identical reference signs.

In contrast to the above-described embodiment, the switch 10' has four optical outputs, which can each be actively switched individually. The optical fibers 13a-d connect each output to an assigned connecting part 14a-d.

The sensor 1' additionally has two pivotable optical scanning elements 20, 20'. Each scanning element 20, 20' has two beam exit windows each having an emission axis. The supply of the exit windows is provided by means of the optical fibers 23a-d. They can therefore be supplied individually with measuring radiation by means of the switch 10'.

While the scanning elements 20 and 20' of sensor 1' are shown with two exit windows each, it is understood that other embodiments can comprise scanning elements having a single exit beam or with more than two exit beams. Likewise additional embodiments with more than two optical scanning elements can be envisaged.

Figure 5:
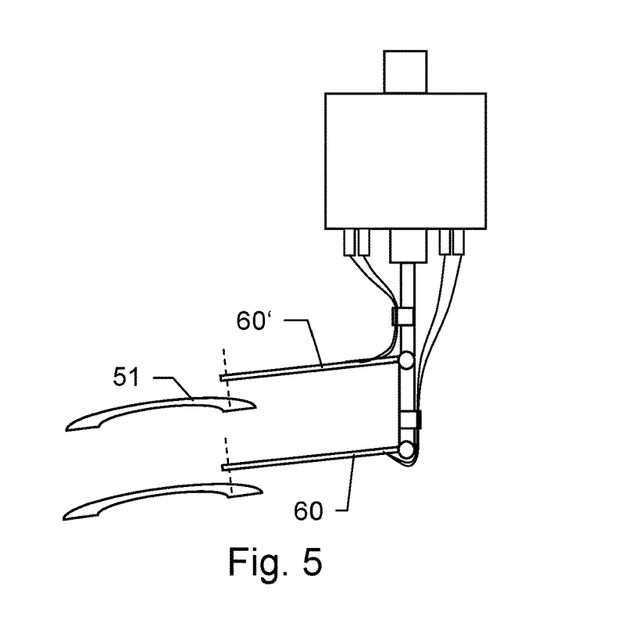
FIG. 5 shows an optical sensor according to the invention which is used to measure a thin object.

The embodiment of FIG. 2 can be used, for example, to measure the two sides of a thin object such as an air foil, a blade or a blisk. Styli with appropriate optical beams can be selected to insure nearly perpendicular incidence of the beams on the surfaces to be measured. Both sides of the object can then be measured in a single movement of the CMM arm by switching between the two beams (as also depicted in FIG. 5). Furthermore, by determining the geometry of the two beams on an appropriate calibration artefact, higher measurement accuracy can be achieved independent of the positioning accuracy of the CMM arm.

The sensor 1' additionally has a memory element 25' (for example, EEPROM or RFID), which is assigned to the scanning element 20. A second such memory element (not shown) can correspondingly be assigned to the second scanning element 20'.

The memory 25' contains data about the measuring parameters provided using the feeler 20. For example, a collimation achievable using an exit optical unit, a focusing, or a permissible measuring range (in particular for each beam emission direction) can be stored thereby. The direction of the beam emission can also be indicated in relation to an axis of extension of the scanning element 20. These data are provided upon a respective activation of a measuring channel of the measuring feeler 20 and/or retrieved by the coordinate measuring machine and processed for the distance measurement.

The coupling of the sensor 1' is embodied as a combined optical and mechanical coupling unit, wherein the optical fiber 5 is arranged inside the coupling and is designed for the joint optical and mechanical coupling. The coupling can in particular be performed automatically, which enables an automatic exchange of measuring sensors on the coordinate measuring machine.

Figure 3:
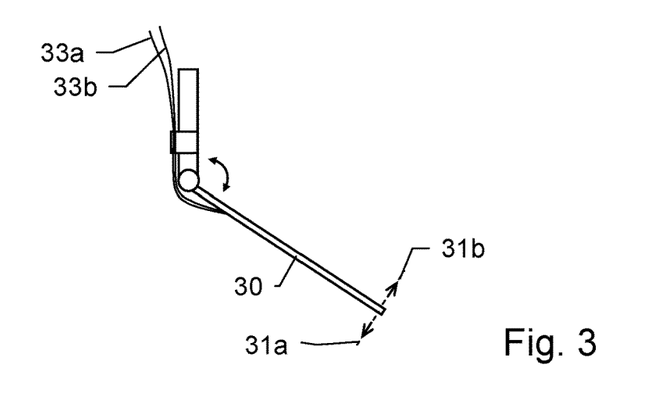
FIG. 3 shows an embodiment of a stylus of an optical sensor according to the invention.

According to a further embodiment—as shown in FIG. 3—the scanning element 30 of a sensor according to the invention is embodied so that the measuring radiation is emittable in two opposite directions 31a and 31b. Such an embodiment is suitable in particular for measuring boreholes or other comparatively narrow internal diameters, for example.

The measurement of the inner surface of the boreholes can be simplified by using a stylus as shown with two beams that are orthogonal to the longitudinal axis of the stylus. The invention is not limited to an embodiment with oppositely emitted beams. The beams need not be pointing in opposite directions but can be at any angle within a plane perpendicular to the stylus axis. With the stylus inserted into a borehole, two measurements can be made by switching between the beams. The stylus is then moved to another location and two additional measurements are made. These steps can be repeated until the desired number of measuring points is attained with a minimum number of movements of the CMM arm. The process can be further speeded up by using a stylus with three or more optical beams in the plane orthogonal to the stylus axis.

The direction in which measuring radiation is to be provided in each case is again switchable by an optical switch of the sensor (not shown here). The two optical fibers 33a and 33b define two measuring channels, wherein each measuring channel provides the emission in one of the two emission directions 31a and 31b, i.e., provides a beam transmission to a corresponding assigned beam exit window.

In one embodiment the emission directions 31a and 31b (and further additional emission axes) are in one particular plane and enclose a defined angle between them.

Alternatively, the directions 31a and 31b are parallel or opposite as shown.

It is obvious that such an embodiment can alternatively be embodied having a further emission axis along the extension of the scanning element 30, i.e., a third emission direction, and the switch then connected to the three measuring channels is configured so that measuring radiation can be applied individually to each of the three channels.

As already mentioned above, the rotary joint shown on the scanning element is solely optional and can accordingly be omitted in other embodiments.

Figure 4:
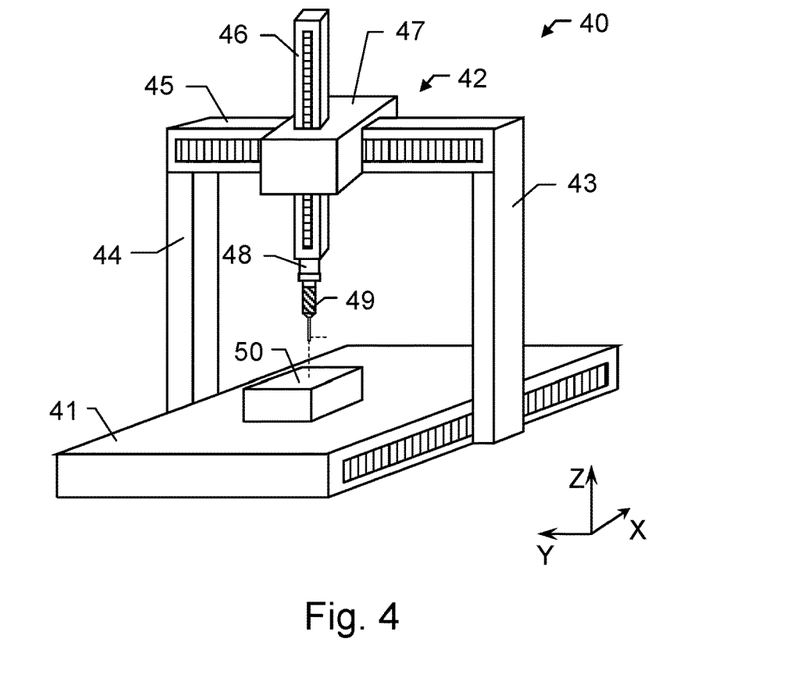
FIG. 4 shows an exemplary embodiment of a coordinate measuring machine having attached an optical probe with an optical switch according to the invention.

In FIG. 4 an exemplary embodiment of a bridge (portal) coordinate measuring machine 40 (CMM) according to the invention is depicted, the coordinate measuring machine 40 comprises a base 41 and a frame structure for linking a probe head 48 to the base 41, the frame structure comprising several frame components 42,43,44,45,46,47 being movable with respect to another. The first frame component 42 is a support having two legs 43,44 which are connected by a bridging portion 45 at their upper ends. Driven by a drive mechanism (not shown), the frame component 42 is capable to move along the longitudinal sides of the base 41. This direction corresponds to a first direction X. The movement of the frame component 42 is in particular performed by a gear rack attached to the base 41, which is meshing with a pinion on the frame component 42.

A carriage 47 is movably arranged on the bridging portion of the frame component 42. The movement of the carriage 47 (which is to be seen as a further frame component) may also be achieved by a rack and pinion. A vertical rod 46 (sleeve, Z-ram), building a further frame component, is movably incorporated into the carriage 47. At the bottom portion of the vertical rod 46 a probe head 48 is provided.

The probe head 48 is movable to any desired point in a measuring volume (work zone) of the coordinate measuring machine 40 in the directions X, Y and Z. The measuring volume is defined by the base 41 and the other frame components and in particular by the range of movability of the carriage 46. The three space directions X, Y and Z are preferably orthogonal to one another, although this is not necessary for the present invention. It should be noted that a drive mechanism and a controller for driving the frame components and, thus, for driving the probe head 48 are not shown.

An object 50 to be measured is positioned in the space of the measuring volume on the base 41.

The probe head 48, on which an optical probe 49 with a stylus according to the invention is arranged, is fastened on the lower free end of the rod 46. The stylus is used in a manner known per se for measuring the object 50 to be measured. However, the present invention is not restricted to coordinate measuring machines with such type of probe but may likewise be applicable with coordinate measuring machines having alternative optical sensors, e.g. not having a stylus. More generally, the probe head 48 may be designed for arranging a contact probe, e.g. a scanning or touch trigger probe, or a non-contact probe, particularly an optical, capacitance or inductance probe, or an articulated probe.

Two of the most common types of bearings between the movable members and the guides are air bearings or ball bearings (e.g. linear circulating plus rails). The air bearings give the advantage that there is no friction in the movement (which may introduce different kind of errors like angle errors or hysteresis). The disadvantage of air bearings is that the stiffness is lower than in ball bearings, so that particularly dynamic errors may occur. In ball bearing types, the stiffness in the bearing system is typically higher but there is friction and the friction forces may introduce errors. However, the invention may be applied for both types of bearings.

Summed up, the coordinate measuring machine 40 is built for determination of three space coordinates of a measurement point on an object 50 to be measured and, therefore, comprises three linear drive mechanisms for provision of movability of the probe head 48 and the optical probe 49 relative to the base 41 in the first, second and third direction (X, Y and Z direction) and particularly machine components providing additional rotatory degrees of freedom (e.g. articulated probe and/or stylus).

Each linear drive mechanism has a linear guide, one in the first, one in the second and one in the third direction (X, Y and Z direction), respectively. In a simple embodiment, the linear guide of the X-direction drive mechanism is formed by two edge-building surfaces of the base 41, the linear guide of the Y-direction drive mechanism is formed by two or three surfaces of the bridge and the linear guide of the Z-direction drive mechanism is formed by a cubical hole in the Y-carriage member.

Furthermore, each linear drive mechanism comprises a movable member being supported for movement along the guide by bearings. In particular, the movable member of the X-direction drive mechanism is embodied as X-carriage having mutually facing surfaces with respect to the above mentioned two guiding surfaces of the base 41. The movable member of the Y-direction drive mechanism is embodied as Y-carriage 47 having mutually facing surfaces with respect to the above mentioned two or three guiding surfaces of the bridge. And, the movable member of the Z-direction drive mechanism is formed by Z-column 46 (sleeve) having mutually facing surfaces with respect to the inner surfaces of the cubical hole in the Y-carriage.

Moreover, each linear drive mechanism comprises a linear measuring instrument for determination of a first, a second or a third drive position, respectively, of each movable member in the first, the second or the third direction (X, Y and Z direction), respectively.

In this exemplary embodiment of FIG. 4, the portal legs each have a movable X-carriage which allows movement of the first frame component 42 in X-direction.

A measuring scale may be part of the X-measuring instrument and is schematically represented on the long side of the base 41, wherein the scale extends parallel to the X-direction. The scale may be a glass measuring scale, e.g. having incremental or absolute coding, with which a drive position in the X-direction of the X-carriage can be determined. It is to be understood that the measuring instrument may furthermore contain suitable sensors for reading the measuring scale, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale is arranged parallel to the Y-direction on the bridging portion of the first frame component 42. Finally, another measuring scale is also arranged parallel to the Z-direction on the Z-ram 46. By means of the measuring scales as part of the linear measuring instruments, it is possible to record the present drive positions of the second frame member in Y-direction and of the sleeve in the Z-direction metrologically in a manner which is known per se.

In the shown embodiment, the base 41 comprises a table with a granite surface plate for supporting the object 50 to be measured, on which the space coordinates of the measurement point are intended to be determined. The object to be measured can also be placed on a rotary table (not shown) which in turn is placed on the base 41 to facilitate the measurement of certain geometries, in particular cylindrically symmetrical ones.

Not shown is a controlling and processing unit, which is designed to actuate the motor drives of the coordinate measuring machine 40 so that the probe head 48 travels to the measurement point. The controlling and processing unit comprises a processor and a memory. In particular, the controlling and processing unit is designed for determining the three space-coordinates of the measurement point on the object 50 as a function of at least the first, the second and the third drive position of the three drive mechanisms.

For manual operation, the control unit may be connected to a user console. It is also possible for the control unit to fully automatically approach and measure measurement points of the object 50 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear, rotary or serial kinematics.

Exemplarily, the CMM may be designed as bridge-type, L-bridge-type, horizontal-arm-type, cantilever-type or gantry-type machine or may be designed as an articulated arm. The CMM could be integrated into machine tools or into a production line. Furthermore, a CMM in context with the present invention also is to be understood as a system for precise positioning and/or precise assembling of work pieces or tools and/or for applying materials, e.g. spraying or printing of paint or other materials. Such a system is designed to provide movement and measurement of positions within a working volume defined by the structure of the respective system and defines a coordinate system, within which positioning of system components with high precision is provided. In particular, such a system provides carrying and placing of a work piece or a tool relative to a further work piece with high accuracy. For instance, a robot providing precise positioning and/or measuring abilities may be operated and controlled based on execution of the dynamic model according to the invention.

Moreover, according to the invention, the controlling and processing unit comprises a functionality for controlling measurements with the optical probe 49. The probe 49 comprises an optical switch which provided guiding the measuring light according to one of the shown measuring (emitting) axes, i.e. the emitting direction can be changed by use of the internal switch as a function of respective measuring conditions.

The measurement of work pieces 51 with complex surface geometries can also be simplified and speeded up by the embodiment shown with FIG. 5. In the case of a blade, a blisk, a gear or a compressor screw, for example, the curved surfaces are difficult to measure with a single tactile or optical probe whose orientation must adjusted to track the surface geometry. An optical measurement of such an object 51 (schematically shown) can be considerably simplified by using styli 60,60' with two beams that are oriented approximately perpendicular to the flanks of the object 51, as shown. For example, if the flanks are angled 60°, then two opposite beams that exit the stylus 60,60' at a 30° angle can be used to scan one flank with one beam and then the opposite flank with the other beam, while moving the stylus 60,60' along the surface of the object 51, e.g. parallel to the course of the surface. An embodiment with a third beam exiting along the axis of a stylus 60,60' can be used to measure the flat part in between the flanks as well as the ridge separating the flanks.

It is apparent that these illustrated figures only schematically illustrate possible exemplary embodiments.

The various approaches can also be combined according to the invention with one another and with devices for distance determination to objects and with measuring devices of the type in question, in particular coordinate measuring machines, of the prior art.

What is claimed is:

1. An optical probe for a measuring device for measuring distance by emitting radiation towards an object and capturing the reflected radiation, the optical probe comprising:
    an optomechanical coupling unit for automated coupling and providing a disconnectable mechanical connection of the optical probe to the measuring device and providing an optical connection with bidirectional transmission of measuring radiation between the measuring device and the optical probe;
    a first optical measuring channel, providing bidirectional transmission of measuring radiation between the measuring device and a first exit window of the optical probe;

a second optical measuring channel, also providing bidirectional transmission of measuring radiation between the measuring device and a second exit window of the optical probe; and a switch for controlled variation of a provision of the transmission of measuring radiation, the variation being providable at least between the first or the second optical measuring channel, wherein the first and the second optical measuring channels and the switch are arranged and configured such that by switching the switch, variation occurs between the transmission of measuring radiation through the first measuring channel and the transmission of measuring radiation through the second measuring channel, and the transmission of measuring radiation is provided in each case only via the first or via the second measuring channel, the first and second optical measuring channels and the switch thus enabling an adaptation to different properties of the object to be measured during a measuring process of the object, without the optical probe having to be exchanged.

2. The optical probe according to claim 1, wherein:
the first exit window has a first optical unit for measuring beam forming and for detecting the reflected radiation, and
the second exit window has a second optical unit for measuring beam forming and for detecting the reflected radiation.

3. The optical probe according to claim 1, wherein:
the first exit window defines a first emission axis for the measuring radiation,
the second exit window defines a second emission axis for the measuring radiation, and
the first emission axis is different from the second emission axis.

4. The optical probe according to claim 3, wherein the first emission axis and the second emission axis enclose a defined angle or are arranged orthogonal to each other.

5. The optical probe according to claim 1, wherein at least the first optical measuring channel has a first optical fiber and the radiation is guidable by means of the first optical fiber.

6. The optical probe according to claim 5, wherein at least the first optical measuring channel is formed by the first or multiple optical fibers.

7. The optical probe according to claim 5, wherein the optical probe comprises a cladding filter on at least one optical fiber.

8. The optical probe according to claim 1, wherein the second optical measuring channel has a second optical fiber and the measuring radiation is guidable by means of the second optical fiber.

9. The optical probe according to claim 1, wherein the switch is configured as an optical switch or a fiber-coupled optical switch.

10. The optical probe according to claim 9, wherein the switch is configured as an electrooptical or acoustic-optical switch or a switch based on MEMS technology.

11. The optical probe according to claim 1, wherein the switch has a single input for coupling in the measuring radiation and two or more outputs for decoupling and providing the measuring radiation alternately for the first or second measuring channel and/or alternately for the first, the second, or at least one further measuring channel.

12. The optical probe according to claim 1, wherein the optical probe comprises at least one stylus, wherein the first and the second exit windows are arranged having beam forming optical units on the stylus and the first and the second optical measuring channels are formed as optical fibers at least partially inside the stylus.

13. The optical probe according to claim 12, wherein the stylus comprises three, four or five exit windows, wherein each exit window defines an emission axis for emission of the measuring radiation.

14. The optical probe according to claim 13, wherein at least two of the emission axes are arranged parallel or coaxial and are arranged orthogonal to at least a further of the emission axes.

15. The optical probe according to claim 13, wherein the stylus is embodied as a star-shaped stylus, wherein each emission axis is orthogonally arranged in relation to at least two further of the emission axes.

16. The optical probe according to claim 13, wherein the emission axes are in one plane and enclose a defined angle there between or are arranged parallel.

17. The optical probe according to claim 1, wherein the optical probe comprises at least a first and a second stylus, wherein the first exit window is arranged having beam forming optical units on the first stylus and the second exit window is arranged having beam forming optical units on the second stylus.

18. The optical probe according to claim 17, wherein the first optical measuring channel is formed as optical fiber at least partially inside the first stylus and the second optical measuring channel is formed as optical fiber at least partially inside the second stylus.

19. The optical probe according to claim 1, wherein the optical probe comprises a modularly removable tactile measuring element for the contacting measurement of measurement points.

20. The optical probe according to claim 19, wherein the tactile measuring element is embodied as a tactile touch-trigger probe or as a tactile scanning probe.

21. The optical probe according to claim 19, wherein the tactile measuring element comprises:
at least two tactile probes, each of which having a stylus, or
a star-shaped tactile stylus which defines at least four tactile measuring directions.

22. The optical probe according to claim 1, wherein the optical probe has an active or passive memory on which defined probe settings are storable, and the memory has retrievable probe data, which provide information with respect to optical or mechanical properties of the optical probe.

23. The optical probe according to claim 1, wherein the optical probe comprises a probe head which provides rotation of:
a sensor,
a stylus, or
a tactile measuring element about at least one rotation axis.

24. A system comprising:
an optical probe according to claim 1; and
a measuring device having:
a distance measuring unit, which measures according to the principle of interferometry, for measuring measurement points on an object;
a radiation source for emitting of measuring radiation,
a detector for detecting at least measuring radiation reflected on the object;
a coupling unit on the measuring device side, wherein the optical probe can be coupled to the coupling unit on the measuring device side by means of its coupling unit to provide a disconnectable mechanical connection and the optical connection with bidirectional measuring radiation transmission between measuring device and optical probe; and a control unit, wherein the control unit is functionally connected to the switch of the optical probe and has a switchover functionality, such that the transmission of measuring radiation is changed between the first and the second measuring channel, and wherein the transmission of measuring radiation is thus only provided in each case via the first or via the second measuring channel, the first and second optical measuring channels and the switch thus enabling an adaptation of the system to different properties of the object to be measured during a measuring process of the object, without the optical probe having to be exchanged.

25. The system according to claim 24, wherein the switchover functionality is configured such that upon the execution thereof, the provision of the transmission of measuring radiation via the first or via the second optical measuring channel is variable during a measuring procedure in a manner controlled as a function of a present normal direction of the object surface to be measured.

26. The system according to claim 24, wherein the measuring device is embodied as a coordinate measuring machine.

* * * * *